Figure 1:
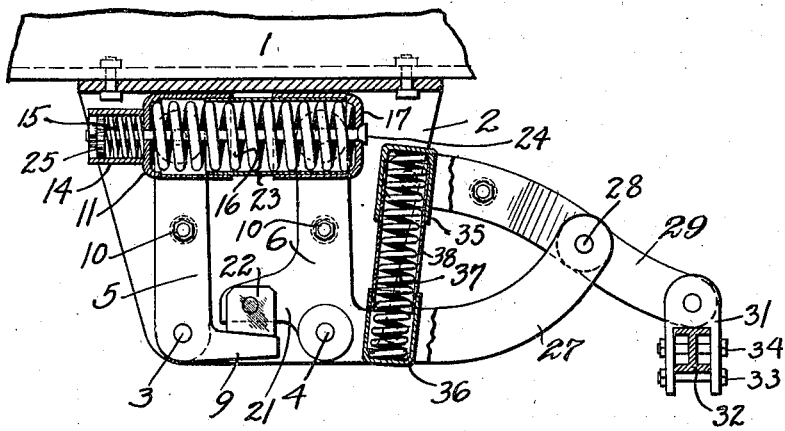

W. W. GUEST.
SPRING SUSPENSION FOR VEHICLES.
APPLICATION FILED MAR. 16, 1915.

1,178,639.

Patented Apr. 11, 1916.

WITNESSES:

INVENTOR.
William W. Guest
BY
Carlos P. Griffin
ATTORNEY.

UNITED STATES PATENT OFFICE.

WILLIAM W. GUEST, OF ALAMEDA, CALIFORNIA.

SPRING SUSPENSION FOR VEHICLES.

1,178,639.  Specification of Letters Patent.  Patented Apr. 11, 1916.

Application filed March 16, 1915. Serial No. 14,711.

*To all whom it may concern:*

Be it known that I, WILLIAM W. GUEST, a citizen of the United States, residing at Alameda, in the county of Alameda, State of California, have invented a new and useful Spring Suspension for Vehicles, of which the following is a specification in such full and clear terms as will enable those skilled in the art to construct and use the same.

This invention relates to a cantaliver spring suspension for vehicles, an object of which is to as far as possible convert vertical road shocks into horizontal thrusts on the vehicle body thereby improving the riding qualities of the vehicle.

Another object of the invention is to produce a spring suspension in which the springs are all in compression thereby reducing the liability to breakage, while at the same time great resiliency is preserved.

Another object of the invention is to produce a suspension which will be a shock absorber as well as a support for the vehicle.

A further object of the invention is to produce a spring suspension which will be capable of permitting the vehicle axle to move through the limit of its movement in a plane substantially at right angles to the frame of the vehicle.

An embodiment of the invention is shown in the drawing in which the same reference numeral is applied to the same portion throughout, but I am aware that there are many modifications thereof.

Figure 2:
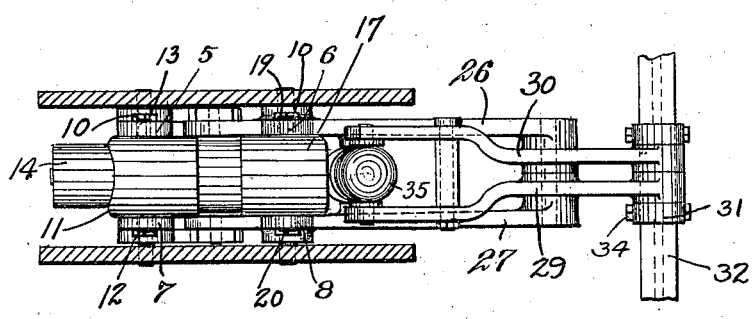
Figure 3:
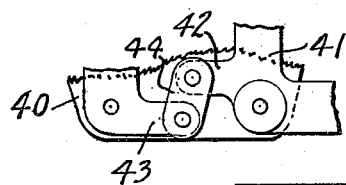

Figure 1 is a side elevation of the complete machine with portions thereof broken away for purposes of illustration, Fig. 2 is a plan view of the complete device with the top of the frame to which it is secured removed to show the operating parts, and Fig. 3 is a side elevation of a slightly different form of connecting two of the pivoted arms together.

The frame of the vehicle is indicated at 1. 2 indicates an inverted U shaped plate to which the operating parts are connected, said plate having bearing pins 3 and 4 to which two bell crank arms 5 and 6 are connected. At the rear of the bell crank arms 5 and 6 are the arms 7 and 8 having a short forwardly projecting arm 9. They are connected together by means of a bolt 10 and at their upper ends are pivoted to the spring cup 11, said cup having oppositely projecting pins 12 and 13 for each of said arms.

The cup 11 has a reduced portion 14 in which is installed a lighter spring 15 than the main spring 16 which is installed in the larger portion of the cup and which bears at its opposite end in a cup 17 carried by the upper portion of the arms 6 and 8.

The arms 6 and 8 are connected to the cup 17 by means of pins 19 and 20. The bell crank arms 6 and 8 each have a rearwardly projecting arm or lug 21 between which lugs a block 22 is pivoted and which block bears upon the short arms 9 of the levers 5 and 7.

A tube 23 surrounds the spring 16 and is tightly fitted into the cup 17 and loosely fits the cup 11 so that the spring is protected from mud and dirt at all times. Extending through the two cups is a bolt 24 which bolt bears upon a washer 25 which fits the inside of the reduced portion of the casing 14 thereby preventing mud and dirt from getting into the spring 15, and said bolt takes up the undue upward movements of the vehicle frame when a bump has been passed over, thereby preventing the cups 11 and 17 from moving so far apart as to cause the spring contained therein to be dislodged or the tube 23 to get out of its proper place.

The levers 6 and 8 have forwardly extending arms 26 and 27 carrying a pivot 28 at their front ends, which pivot forms a support for two levers 29 and 30, connected with the axle clip 31. The axle clip 31 is connected to the axle 32 by means of suitable bolts 33 and 34 and the rear portions of the arms 29 and 30 are spread outwardly to overlie the levers 26 and 27 and are connected with a cup 35, while the arms 26 and 27 are connected with a cup 36. Said cups have a spiral spring 37 therein, which spring is under compression and tends to force them apart and a tube 38 surrounds said spiral spring and is slidable in the cup 36 to allow the necessary movement between the levers 29 and 30 and 27 and 26. The position of the levers connected with the axle with respect to the levers connected to the pivoted pin 4 is such that if the vehicle body rebounds above its normal road line after striking a heavy bump the cup 35 strikes the underside of the support 2 and the spring and tube in the cups therefor cannot be dislodged. Any reverse action of the apparatus tends to compress the spring 15 and quick road shocks due to passing over bumps at a high rate of speed will be principally taken up between the levers 29 and 30 and 27 and 26, the friction of the block 22 on the lug 9 being such as to cause the two pairs of levers 5 and 7 and 6 and 8 to move comparatively slowly, but in any event their upper ends will tend to come together through twice the distance that the outer ends of the levers 26 and 27 do because they are moving in opposite directions.

In Fig. 3 there is shown a portion of the support for the spring arms and a link for connecting the two arms. In this figure 40 indicates the support which is connected with the vehicle frame, 41 the arm which extends toward the vehicle axle, 42 the lug thereon which is connected with the lug 43 on the other arm by means of a short link 44. In this form of the invention the advantage of the friction block 22 is lost, but the two arms are pivotally connected together and therefore the construction may be more suitable in certain situations.

Having thus described my invention what I claim as new and desire to secure by Letters Patent of the United States, is as follows, modifications within the scope of the claims being expressly reserved:

1. A spring suspension for vehicles comprising a frame to be secured to the vehicle body, an L-shaped arm pivoted thereto at the corner of the L, resilient means bearing on the upwardly extending member of the L-shaped arm for holding said arm in a given position, a secondary arm pivoted to the first arm, resilient means bearing upon each arm to hold them in a given position, and a clip for connecting one end of the second arm to the axle of a vehicle.

2. A spring suspension for vehicles comprising a frame adapted to be secured to the vehicle body, a pair of pivoted arms, means to cause the upper ends of said pivoted arms to move toward each other, means to hold them resiliently apart, a secondary arm pivotally connected with one of said arms, resilient means bearing upon said secondary arm and the arm to which it is pivoted to hold the two arms in a given position, and means to connect the secondary arm to the vehicle axle.

3. A spring suspension for vehicles comprising a frame adapted to be connected with the vehicle body, a pair of arms pivoted to the frame, connections between said arms whereby their upper ends will move toward each other, a spring holding the upper ends of said arms normally apart, a secondary arm pivoted to one of the first mentioned arms and to the vehicle axle, and resilient means for holding said second arm and the arm to which it is pivoted in a given position.

4. A vehicle suspension comprising a frame adapted to be connected to the body of a vehicle, a pair of arms connected with said frame, connections between said arms whereby their upper ends will move toward each other on any upward movement of one end of any one of the arms, a spring interposed between the upper ends of said arms to hold them resiliently in a given position, a secondary arm pivoted to the vehicle axle, a spring interposed between the end of the secondary arm and the arm to which it is pivoted, to hold said arms resiliently in a given position, and resilient means for holding the upper ends of the first two arms together.

5. A spring suspension for vehicles comprising a frame adapted to be secured to the body of a vehicle, a pair of bell crank levers pivoted to said frame, a connection between said bell crank levers to cause their upper ends to move toward each other upon any upward movement of one end of one of the levers, a compression spring to hold said upper ends of said levers resiliently apart, a secondary lever connected with the end of one of said bell crank levers, a compression spring interposed between the latter lever and the bell crank lever to which it is connected to hold them resiliently in a given position, means to connect the secondary lever to the axle of a vehicle, and a compression spring for resiliently holding the upper ends of the two bell crank levers together.

6. A spring suspension for vehicles, comprising a frame, a pair of bell crank levers therein, a friction block bearing upon one of said bell crank levers and pivoted to the other lever, a compression spring interposed between the upper ends of two bell crank levers, a secondary lever connected with the projecting end of one of said bell crank levers, springs to hold said levers resiliently in a given position, a clip to hold the secondary lever to the axle of a vehicle, and resilient means to prevent the bell crank levers from moving apart more than a given amount.

In testimony whereof I have hereunto set my hand this 9th day of March, 1915, in the presence of the two subscribed witnesses.

WILLIAM W. GUEST.

Witnesses:
C. C. Russ,
Carlos P. Griffin.